Figure 1:
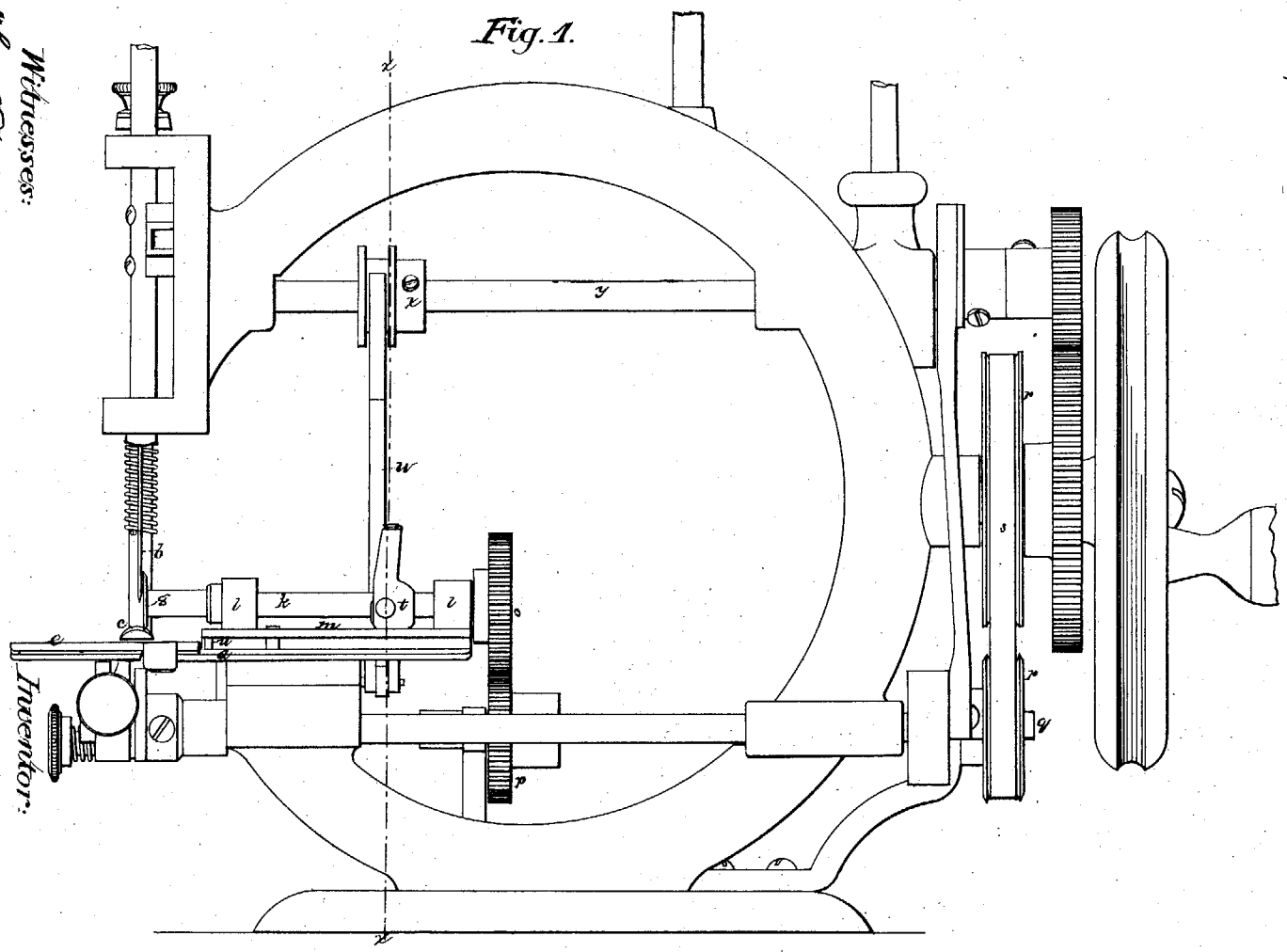

2 Sheets--Sheet 1.

W. A. SPRINGER.

Trimming or Cutting Attachments for Sewing-Machines

No. 6,088. Reissued Oct. 13, 1874.

Witnesses:

Thos. H. Dodge

Edwin E. Moore

Inventor:

William A. Springer

THE GRAPHIC CO. PHOTO-LITH. 39 & 41 PARK PLACE, N.Y.

2 Sheets--Sheet 2.

W. A. SPRINGER.

Trimming or Cutting Attachments for Sewing-Machines

No. 6,088. Reissued Oct. 13, 1874.

Witnesses:
Thos. H. Dodge
Edwin E. Moore

Inventor:
William A. Springer

THE GRAPHIC CO. PHOTO-LITH. 39 & 41 PARK PLACE, N.Y.

UNITED STATES PATENT OFFICE.

WILLIAM A. SPRINGER, OF MARLBOROUGH, MASSACHUSETTS.

IMPROVEMENT IN TRIMMING OR CUTTING ATTACHMENTS FOR SEWING-MACHINES.

Specification forming part of Letters Patent No. 147,441, dated February 10, 1874; reissue No. 6,088, dated October 13, 1874; application filed September 21, 1874.

*To all whom it may concern:*

Be it known that I, WILLIAM A. SPRINGER, of Marlborough, in the county of Middlesex and Commonwealth of Massachusetts, have invented an Improved Trimming or Cutting Attachment for Sewing-Machines; and I do hereby declare that the following, taken in connection with the drawings which accompany and form part of this specification, is a description of my invention sufficient to enable those skilled in the art to practice it.

United States Letters Patent No. 142,290, dated August 26, 1873, have been granted to me for an improvement in trimming attachments for sewing-machines. In said patent I show a rotary disk-cutter fixed on a shaft above the work-supporting plate, and having a positive continuous rotative movement imparted to it, the bottom of the cutting-edge extending down below the top surface of the work-plate, and close to the path of the needle, and the cutter operating to trim off the edge of the work, so as to leave a finished edge parallel to or equidistant from the line of stitches. In my present invention I use a similar cutter, and for the same purpose; but to improve its cutting action, and to render the edge more enduring as to keenness, I impart to the cutter not only its positive and continuous rotative movement, but also a reciprocating vertical movement, the cutter being raised when the work is fed, and descending and cutting only when the work is stationary. Operated in this manner, I find that the cutting is more easily performed, and that the cutting-edge is not dulled so soon as when the work is fed forward against the cutter.

My present invention consists, primarily, in combining, with the stitch-forming and the feeding mechanism, the cutter having the combined rotative and reciprocating vertical movements, thereby constituting a positively-rotating, but intermittingly-acting, trimming-cutter.

The drawing represents a machine embodying the invention.

Figure 2:
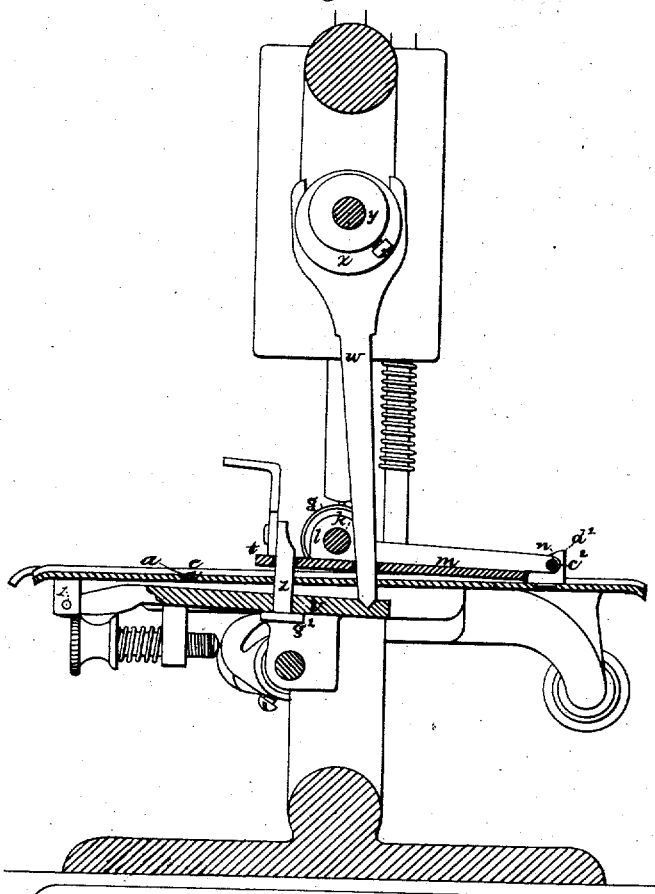
Figure 3:
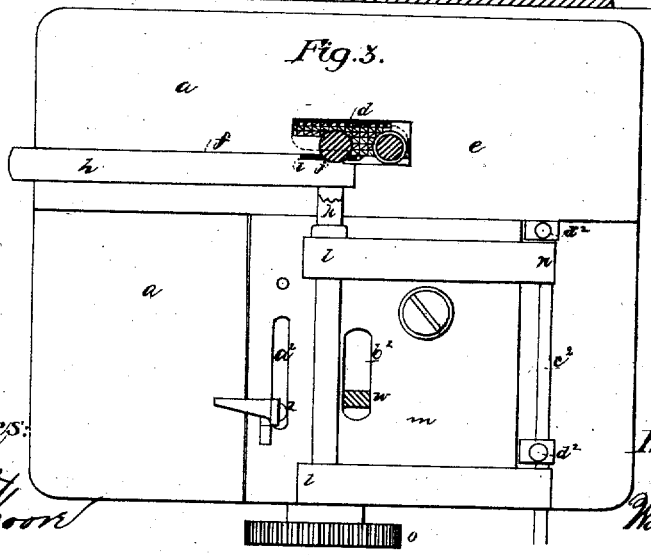

Figure 1 shows the machine in side elevation. Fig. 2 is a vertical section on the line *x x*, Fig. 1; and Fig. 3 is a plan of the work-plate and the mechanism thereon.

*a* denotes the work-plate, *b* the needle, *c* the presser-foot, *d* the needle-bar, of an ordinary sewing-machine. The front part of the work-plate is shown as covered by a thin plate, *e*, in which is made a narrow slot or groove, *f*, the front wall of which forms an edge against which the straight face of the cutter-wheel *g*, or the edge of such wheel, runs to cut with a shear-cut. This groove or slot I prefer to make by forming the plate *e* with a long slot, one wall of which makes the wall against which the cutter plays, and with a slide, *h*, running into this slot, this slide being cut away at *i* to form the groove, the edge *j* forming one wall thereof. The cutter *g* is fixed upon the end of a shaft, *k*, turning in bearings *l* on a plate, *m*, which plate is hinged at *n*. The opposite end of the shaft bears a gear, *o*, which meshes into and is driven by a gear, *p*, on a shaft, *q*, connected to the driving-shaft by pulleys *r r* and a belt, *s*. The plate *m* is made capable of vertical swing movements on the hinge-pin *n*, and is pressed up against a stop-lever, *t*, by a suitable spring, *u*. Under the work-plate *a* is a lever, *v*, hinged at 1, and connected by a link or intermediate arm, *w*, with an eccentric, *x*, on the needle-driving shaft *y*, and from this lever extends an arm, *z*, to which the stop-lever *t* is jointed, the arm extending through the work-plate and through a slot, $a^2$, in the hinged plate, and the link or intermediate arm *w* extending through the work-plate and through a slot, $b^2$, in the hinged plate.

As the shaft *y* in turning throws down the needle, the eccentric depresses the link or intermediate arm *w*, and the link or intermediate arm *w* the lever *v*, the lever, by its connection with the stop-lever *t*, against which the spring bears the hinged plate, drawing down the hinged plate, and thereby carrying the cutter-shaft and cutter down, the descent of the cutter being after the feed of the work, so that the cutter acts both by its downward movement and its rotative movement. As the shaft *y* turns to raise the needle, the eccentric permits the link or intermediate arm *w* to rise, and the spring throws up the hinged plate and the cutter, the rise taking place before the work is fed. By turning the lever *t* down to the plate *m*, the plate will be raised by its spring sufficiently to permit the work to be readily introduced beneath the cutter-wheel.

The plate $m$ is hinged to a pin, $c^2$, extending through ears or bearings $d^2$; and, when the plate is raised, it may be slid back upon the pin $c^2$, the slots $a^2$ $b^2$ permitting the plate to move. When thus moved, work may be introduced over the greater part of the surface of the work-plate for common sewing, or when there is to be no trimming; and, by withdrawing the pin $c^2$, and the pin $z$ and nut $g^2$, the plate $m$ and link or intermediate arm $w$ may be wholly removed, and also the bearings $d^2$, each of which is made with a screw-shank, screwing into a nut-thread in the work-plate.

Having described one good and desirable way of applying my said improvements in trimming or cutting attachments to practical use, what I claim therein as new and of my invention, and desire to secure by Letters Patent, is—

1. In combination with a stitch-forming and feed mechanism of a sewing-machine, a positively-rotated, but intermittingly-acting, trimming-cutter, for the purposes stated.

2. In combination with a stitch-forming and feed mechanism, a positively-rotated cutter, having a vertical reciprocating movement, substantially as and for the purpose set forth.

3. In combination with the plate $a$, the slide $h$, cut to form the slot or groove $i$, substantially as shown and described.

4. The hinged bearing-plate $m$, carrying a cutter, and having a spring to force it upward, combined with an eccentric, $x$, and link or intermediate arm $w$ to force it downward, substantially as shown and described.

5. The eccentric $x$, link or intermediate arm $w$, lever $v$, arm $z$, and cam-lever $t$, and plate $m$, combined and operating substantially as shown and described.

6. In combination with the hinged plate for supporting the cutter, the removable bearings $d^2$, substantially as shown and described.

WILLIAM A. SPRINGER.

Witnesses:

THOS. H. DODGE,

E. E. MOORE.